United States Patent
Kitaguchi

(10) Patent No.: US 7,425,071 B2
(45) Date of Patent: Sep. 16, 2008

(54) VIDEO DISPLAY DEVICE AND DECORATION DISPLAY BODY

(75) Inventor: Masaaki Kitaguchi, Saitama (JP)

(73) Assignee: Kimoto Co., Ltd. (JP)

( * ) Notice: Subject to any disclaimer, the term of this patent is extended or adjusted under 35 U.S.C. 154(b) by 362 days.

(21) Appl. No.: 10/556,465

(22) PCT Filed: May 13, 2004

(86) PCT No.: PCT/JP2004/006461

§ 371 (c)(1),
(2), (4) Date: Nov. 10, 2005

(87) PCT Pub. No.: WO2004/102270

PCT Pub. Date: Nov. 25, 2004

(65) Prior Publication Data

US 2006/0221313 A1 Oct. 5, 2006

(30) Foreign Application Priority Data

May 14, 2003 (JP) .............................. 2003-136171

(51) Int. Cl.
G03B 21/26 (2006.01)
G03B 21/56 (2006.01)
(52) U.S. Cl. ........................... 353/10; 353/79; 353/122; 359/460; 359/456

(58) Field of Classification Search ......... 359/456–458, 359/478, 479, 450, 452, 453, 460, 477; 353/28, 353/42, 10, 29, 35, 62, 122, 79; 348/51, 348/59, 60

See application file for complete search history.

(56) References Cited

U.S. PATENT DOCUMENTS

| | | | | |
|---|---|---|---|---|
| 2,625,852 A | * | 1/1953 | Van Orden | 353/29 |
| 3,657,474 A | * | 4/1972 | Turnrose | 348/835 |
| 4,164,823 A | * | 8/1979 | Marsico | 40/427 |
| 5,787,618 A | * | 8/1998 | Mullis | 40/219 |
| 6,002,500 A | * | 12/1999 | Kim | 359/15 |
| 6,661,578 B2 | * | 12/2003 | Hedrick | 359/620 |
| 6,733,142 B1 | * | 5/2004 | Young et al. | 353/122 |

(Continued)

FOREIGN PATENT DOCUMENTS

JP 8-286277 11/1996

(Continued)

*Primary Examiner*—Andrew T Sever
(74) *Attorney, Agent, or Firm*—Bacon & Thomas, PLLC

(57) ABSTRACT

An image display apparatus that can display three-dimensional-like images having a superior visual effect in a simple manner is provided. This image display apparatus is constituted by a projector 20 and a decorative display unit 10 comprising a light transmitting substrate having multiple colored dots arranged on one surface of the substrate and multiple light transmitting light converging elements arranged on the other surface of the substrate, at least a part of which is provided with an image formation means for forming an image from light projected from the projector 20. With this image display apparatus, a virtual image of the dots is formed on a plane different from the plane of the image projected on the image formation means to provide a three-dimensional-like visual effect. It is preferred that directivities of the arrangements of the dots and light converging elements of the decorative display unit 10 are identical to each other, and pitches thereof are different from each other.

20 Claims, 3 Drawing Sheets

U.S. PATENT DOCUMENTS

| | | | |
|---|---|---|---|
| 2005/0094103 A1* | 5/2005 | Robinson et al. | 353/10 |
| 2006/0274275 A1* | 12/2006 | Bremer et al. | 353/28 |
| 2006/0284788 A1* | 12/2006 | Robinson et al. | 345/3.1 |

FOREIGN PATENT DOCUMENTS

| | | |
|---|---|---|
| JP | 9-101484 | 4/1997 |
| JP | 2001-66696 | 3/2001 |
| JP | 2001-352565 | 12/2001 |
| JP | 2002-156706 | 5/2002 |
| JP | 2002-162599 | 6/2002 |

* cited by examiner

VIDEO DISPLAY DEVICE AND DECORATION DISPLAY BODY

FIELD OF THE INVENTION

The present invention relates to an image display apparatus which enables three-dimensional-like expression of images and can display images having a superior visual effect.

Three-dimensional images have a superior visual effect, which is different from that of two-dimensional images, and various techniques for displaying three-dimensional-like images have been developed. For example, apparatuses that can display three-dimensional-like images are proposed in Japanese Patent Unexamined Publication (KOKAI) Nos. 2002-162599 and 2001-352565.

However, these apparatuses require a special projector, special projection technique and so forth, and they cannot be conveniently used.

Therefore, an object of the present invention is to provide an image display apparatus that can display three-dimensional-like images having a superior visual effect in a simple manner.

DISCLOSURE OF THE INVENTION

In order to achieve the aforementioned object, the image display apparatus of the present invention is provided with a projector, a decorative display means comprising a light transmitting substrate having multiple colored dots arranged on one surface of the substrate and multiple light transmitting light converging elements arranged on the other surface of the substrate for forming a virtual image of the dots at a position distant from the surface of the substrate on which the dots are arranged in a direction crossing the substrate, and a means for forming an image of light projected from the projector on the light transmitting substrate.

Alternatively, the image display apparatus of the present invention comprises a decorative display means comprising a light transmitting substrate having multiple colored dots arranged on one surface of the substrate and multiple light transmitting light converging elements arrange on the other surface of the substrate for forming a virtual image of the dots at a position distant from the surface of the substrate on which the dots are arranged in a direction crossing the substrate, and an image displaying means disposed adjacent to the decorative display means.

The image displaying means consists of, for example, a projector and an image formation means for forming an image from light projected from the projector.

Preferably, directions of the arrangements of the dots and light converging elements of the decorative display means are identical to each other, and pitches thereof are different from each other.

Preferably, the decorative display means forms an enlarged virtual image having the same shape as the dots at a position behind the dots.

Preferably, the decorative display means forms an enlarged virtual image having the same shape as the dots at a position in front of the dots.

The decorative display means of the present invention may also comprise a light transmitting substrate having multiple colored dots arranged on one surface of the substrate and multiple light transmitting light converging elements arranged on the other surface of the substrate, at least a part of which is provided with an image formation means for forming an image from light projected from a projector.

BEST MODE FOR CARRYING OUT THE INVENTION

The embodiments of the present invention will be explained hereafter.

Figure 1:
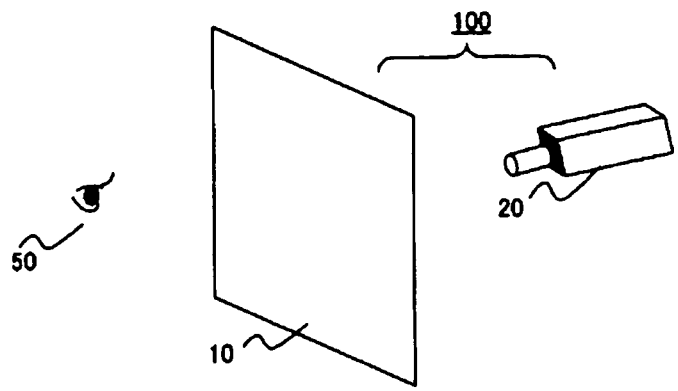
FIG. 1 shows an image display apparatus according to the first embodiment of the present invention.

FIG. 1 shows an image display apparatus 100 according to the first embodiment of the present invention. This image display apparatus 100 comprises a projector 20, and a decorative display unit 10 functioning as a screen on which an image projected from the projector 20 is displayed and being for imparting perspective (feeling of depth) to the image projected on the screen. In the decorative display unit 10, multiple dots are arranged on one surface thereof, and multiple light converging elements are arranged on the other surface thereof. By these arrangements, a virtual image of the dots is formed at a position different from that of the plane of the image projected on the decorative display unit 10, and thereby a feeling of depth is imparted to the image.

The projector 20 is for projecting an image onto the decorative display unit 10, and a conventionally well-known projector such as a liquid crystal projector can be used. When the decorative display unit is used as a light transmitting screen, the projection is performed from the side of the surface of the decorative display unit on which the dots are arranged, and when the decorative display unit is used as a light reflecting screen, the projection is performed from the side of the surface of the decorative display unit on which the light converging elements are arranged.

The embodiment shown in FIG. 1 uses the decorative display unit 10 as a light transmitting screen, and hence the projector 20 is disposed behind the decorative display unit 10 when it is seen from a viewer 50. Although not shown in the drawing, when the decorative display unit 10 has a function of a light reflecting screen, the projector 20 is disposed on the same side as the viewer 50 with respect to the decorative display unit 10.

Figure 2:
FIG. 2 shows a sectional view of an example of the decorative display unit of the present invention.
Figure 3:
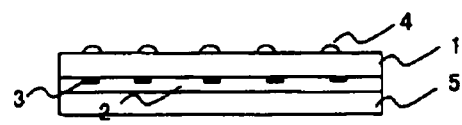
FIG. 3 shows a sectional view of another example of the decorative display unit of the present invention.

Hereafter, components of the decorative display unit 10 having such a function as described above will be explained in detail, respectively. Side views of the decorative display bodies of light transmission type and light reflection type are schematically shown in FIGS. 2 and 3, respectively. As shown in the drawings, each decorative display unit 10 comprises at least a light transmitting substrate 1 and a light diffusing layer 2, wherein multiple colored dots 3 are arranged on one surface of the light transmitting substrate 1, and multiple light converging elements 4 having a light transmitting property are arranged on the other surface. The decorative display unit 10 is incorporated into the image display apparatus for use so that the surface on which the light converging elements 4 are arranged should face the viewer side.

As the light transmitting substrate 1, those transmitting light may be used without particular limitation, and those in the form of a film or plate consisting of glass or plastics and so forth can be used. Further, plastic films or glass plates may be laminated to form the light transmitting substrate. The preferred thickness of the light transmitting substrate is suitably determined depending on the sizes of the light converging elements and dots described later, and cannot be generally defined. However, those having a thickness of about 0.1 to 10 mm, preferably about 1 to 5 mm, can be suitably used.

Figure 4:
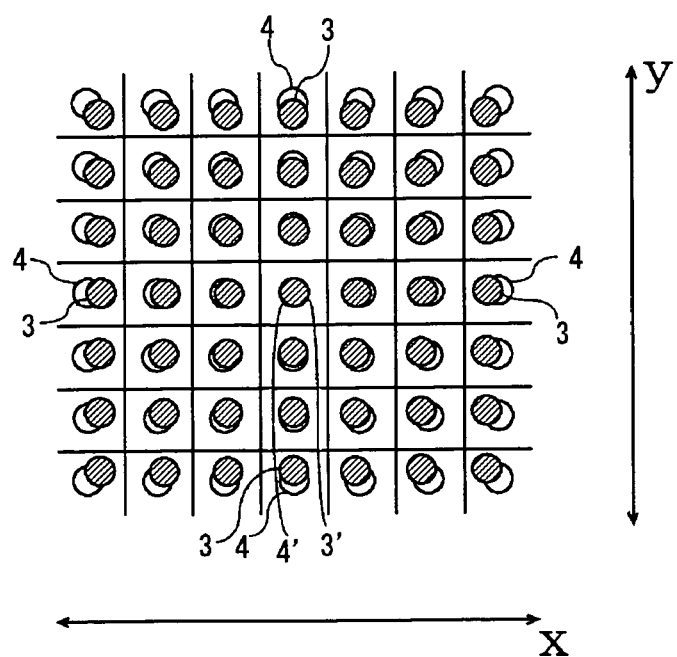
FIG. 4 shows an example of arrangement pattern of dots and light converging elements of the decorative display unit of the present invention.
Figure 5:
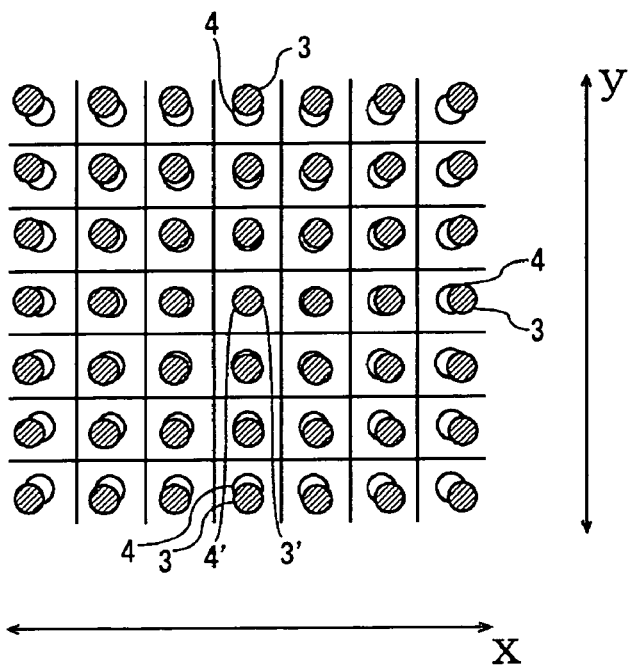
FIG. 5 shows a plan view of another example of arrangement pattern of dots and light converging elements of the decorative display unit of the present invention.

The dots 3 and the light converging elements 4 are formed on both sides of such a light transmitting substrate 1. Examples of the arrangement pattern of the dots and light converging elements are shown in FIGS. 4 and 5. The dots 3 are formed from a colored material such as colored ink, and they may or may not transmit light. As for the shape of the dots, although those having a circular shape are used in FIGS. 4 and 5, the shape is not particularly limited, and an arbitrary shape such as circular shape, quadrangle shape, star shape, triangle shape and elliptical shape may be used. Although the size of each dot is not particularly limited, it is desirably ½ or less, preferably ⅕ or less, of the thickness of the light transmitting substrate. Specifically, the longer diameter is preferably about 0.1 µm to 1 mm, more preferably about 1 µm to 100 µm. The sizes of the dots may differ in a part of the decorative display unit.

The dots 3 are preferably arranged with a directivity, and in the embodiments shown in FIGS. 4 and 5, the dots are uniformly arranged along the x-direction and the y-direction perpendicular to the x-direction with the same pitches in the shape of matrix. However, besides the shape of matrix, they may be radially arranged. When they are arranged in the shape of matrix, they may be arranged not only along perpendicularly intersecting directions but also along one direction and another direction forming an angle less than or larger than 90°. Moreover, for one arrangement direction, the same or different pitches may be used. Furthermore, when they are arranged along two or more arrangement directions, the pitches may be different along every arrangement direction.

The light converging elements 4 have a role of forming a virtual image of dots to be displayed as a three-dimensionally enlarged image, and are formed from a light transmitting material such as light transmitting ink. The shape of each light converging element is not particularly limited so long as it convexly bulges, and it may have a circular shape, quadrangle shape, star shape, triangle shape, elliptical shape or the like as the planar shape.

Although the size of each light converging element is not particularly limited, the desirable size is ½ or less, preferably ⅕ or less, of the thickness of the light transmitting substrate. Specifically, the largest diameter is preferably about 0.1 µm to 1 mm, more preferably about 1 µm to 100 µm. Moreover, the sizes of the light converging elements may differ in a part of the decorative display unit.

The shape of the light converging element is not particularly limited in relation to the shape of the dot, and the shapes of them may be the same or different. However, it is preferred that the largest diameter of the dot is equal to or smaller than the largest diameter of the light converging element.

Like the dots, the light converging elements 4 are preferably arranged with a directivity, and they may be arranged in the shape of matrix, or they may be radially arranged. When they are arranged in the shape of matrix, they may be not only along perpendicularly intersecting directions arranged but also along one direction and another direction forming an angle less than or larger than 90°. Moreover, for one arrangement direction, the same or different pitches may be used. Furthermore, when they are arranged along two or more arrangement directions, the pitches may be different along every arrangement direction.

Although the arrangement of the light converging elements is not particularly limited in relation to the arrangement of the dots, it is preferred that the dots and the light converging elements are arranged in the same directivity with different pitches as shown in FIGS. 4 and 5. By using the same directivity and different pitches for the arrangements of the dots and the light converging elements, the dots can be displayed in a three-dimensionally enlarged size, and generation of moire can also be prevented.

To display of the dots in a three-dimensionally enlarged size means a state that an enlarged virtual image of the same shape as the dots (henceforth also simply referred to as "virtual image") is formed at a position in front of or behind the plane on which the dots are actually formed due to the relationship of the dots and the light converging elements, and the decorative display unit 10 of the present invention is preferably constructed so that the virtual image should be formed at one of positions in front of and behind the plane on which the dots are formed or at both the positions.

In the embodiment shown in FIG. 4, the dots and the light converging elements are arranged so that an enlarged virtual image having the same shape of the dots should be formed at a position behind the plane on which the dots are formed. Specifically, the dots and the light converging elements are provided so as to satisfy the following requirements.

1) The light converging elements should have the same shape and same size.
2) The colored dots should have the same shape and same size.
3) At least one set of light converging element and dot should exactly overlaps in the up-and-down direction (provided that either of the planes is disposed upside) (the light converging element and dot exactly overlapping as described above are called "reference light converging element 4'" and "reference dot 3'", respectively, and the same shall apply hereafter).
4) The light converging elements and dots should be arranged so that dots 3 at the same distance from the reference dot 3' are shifted inward by the same length with respect to light converging elements 4 corresponding to the dots 3 along the radial directions from the reference dot 3' as the center, and more outer dots with respect to the reference dot 3' should be shifted by a larger length.

Further, in the embodiment shown in FIG. 5, the dots and light converging elements are arranged so that an enlarged virtual image having the same shape of the dots should be formed at a position in front of the plane on which the dots are formed, and specifically, the dots and light converging elements are formed so as to satisfy the following requirements.
1) The light converging elements should have the same shape and same size.
2) The colored dots should have the same shape and same size.
3) At least one set of light converging element and dot should exactly overlaps in the up-and-down direction.
4) The light converging elements and the dots should be arranged so that dots 3 at the same distance from the reference dot 3' are shifted outward by the same length with respect to light converging elements 4 corresponding to the dots 3 along the radial directions from the reference dot 3' as the center, and more outer dots with respect to the reference dot 3' should be shifted by a larger length.

By forming a virtual image of the dots in such a manner as described above, a plane image formed on the decorative display unit is recognized at a position in front of or behind the virtual image, and thus an image having a feeling of depth and superior visual effect can be visually recognized.

Further, the decorative display unit may have portions in which the enlarged virtual image of the same shape as the dots is formed in front of the dot-formed plane and portions in which the enlarged virtual image of the same shape as the dots is formed behind the dot-formed plane in an intermingled pattern. For example, the pattern shown in FIG. 4 is formed in a peripheral portion of the decorative display unit, and the pattern shown in FIG. 5 is formed in an inner portion. By forming portions in which the positions for forming a virtual image are different in one decorative display unit as described above, three of the virtual image recognized at a front position, the plane image and the virtual image recognized at a rear position are recognized at positions different for the depth direction, and thus a more superior visual effect can be provided.

Figure 6:
FIG. 6 shows a sectional view of another example of the decorative display unit of the present invention.

In order to form the dots on one surface of the light transmitting substrate 1 and the light converging elements on the other surface, there can be employed, for example, a method of printing multiple dots on one surface by using colored ink and forming convex light converging elements on the other surface, a method of preparing two light transmitting substrates, printing multiple dots on one of the light transmitting substrates, forming convex light converging elements on the other light transmitting substrate and adhering them with an adhesive 6 or the like as shown in FIG. 6, and so forth. As a method for forming the light converging elements in a convex shape, there can be employed, for example, a method of forming them by molding or by using a shaping film when a plate or film constituting the light transmitting substrate is molded, a method of forming them by printing with colorless or colored light transmitting ink on a plate or film constituting the light transmitting substrate, and so forth. Examples of the means for the printing include well-known screen printing, transfer printing, and so forth. When they are formed by screen printing, convex light converging elements can be formed by using a screen fabric satisfying the condition of 10≦screen ruling≦70.

In order to arrange the dots and the light converging elements as shown in FIG. 4, for example, the light converging elements are formed by screen printing with such a screen fabric that the pitches of the elements should be the same as the pitches of squares formed by screen lines constituting the screen fabric, and the dots are formed similarly by screen printing with such a screen fabric having a screen ruling near but larger than that of the screen fabric used for forming the light converging elements so that the pitches of the dots should be the same as the pitches of squares formed by screen lines constituting the screen fabric. This formation of light converging elements and the dots is performed so that at least one set of light converging element and dot should exactly overlap each other in the up-and-down direction.

Further, in order to arrange the dots and the light converging elements as shown in FIG. 5, the light converging elements are formed by screen printing with such a screen fabric that the pitches of the elements should be the same as the pitches of squares formed by screen lines constituting the screen fabric, and the dots are formed similarly by screen printing with such a screen fabric having a screen ruling near but smaller than that of the screen fabric used for forming the light converging elements so that the pitches of the dots should be the same as the pitches of squares formed by screen lines constituting the screen fabric. This formation of light converging elements and dots is performed so that at least one set of light converging element and dot should exactly overlap each other in the up-and-down direction.

Hereafter, the light diffusing layer 2 will be explained. The light diffusing layer 2 constitutes an image formation means for imparting predetermined haze to at least a part of the decorative display unit 10 and forming an image from light projected from the projector, and it consists of, for example, a layer comprising a light transmitting binder and inorganic microparticles or organic microparticles dispersed in the binder. Examples of the inorganic microparticles include microparticles of silica, alumina, talc, zirconia, zinc oxide, titanium dioxide and so forth, and examples of the organic microparticles include microparticles of polymethyl methacrylate, polystyrene, polyurethane, benzoguanamine, silicone resin and so forth.

The haze referred to herein means the haze value according to JIS-K 7136:2000, and it is a value calculated in accordance with the equation: Haze $(\%)=[(\tau_4/\tau_2)-\tau_3(\tau_2/\tau_1)]\times 100$ ($\tau_1$: luminous flux of incident light, $\tau_2$: total luminous flux transmitting a test piece, $\tau_3$: luminous flux diffused in the apparatus, $\tau_4$: luminous flux diffused in the apparatus and the test piece). In order to form an image from light projected from the projector, the haze should be 40% or more, preferably 60% or more, more preferably 80% or more, and it can be suitably adjusted by adjusting the amount of inorganic microparticles or organic microparticles added, thickness of the light diffusing layer and so forth.

In the embodiment shown in FIG. 2, the light diffusing layer 2 is formed as an image formation means on the dot side of the light transmitting substrate 1. However, in order to form image from light projected from the projector on the decorative display unit, it is sufficient that a portion having a haze within the aforementioned range should be provided in the decorative display unit. Therefore, it is also possible to adhere a plastic film in which such a light diffusing layer as described above is formed or to use a substrate in which inorganic microparticles or organic microparticles are dispersed, as the light transmitting substrate.

Further, when the decorative display unit is used as a light transmitting screen, it must have a light transmitting property in such a degree that an image formed on the decorative display unit can be visually recognized. Specifically, the decorative display unit as a whole desirably has a total light transmission (JIS-K 7361-1:1997) of 35% or more, preferably 50% or more, more preferably 80% or more.

On the other hand, when the decorative display unit is used as a light reflecting screen, a light reflecting layer 5 is preferably provided on the dots of the decorative display unit as shown in FIG. 3. Examples of the light reflecting layer include conventionally known light reflecting layers including those comprising a plate or film of metal such as aluminum and silver, those comprising a plastic film on which a metal film is formed by vapor deposition, sputtering or the like, those comprising a resin layer containing a white pigment, and so forth.

The thus constructed decorative display unit 10 can be used as a screen on which an image of light projected from the projector is formed on the decorative display unit (light diffusing layer). When the image is formed, a plane image projected on the screen and a virtual image overlapping each other are seen by a viewer, and thus an image having a feeling of depth and superior visual effect can be visually recognized.

Figure 7:
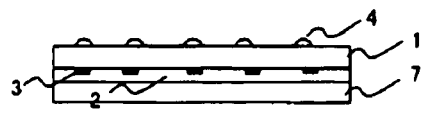
FIG. 7 shows is a sectional view of a further example of the decorative display unit of the present invention.

In addition to the components described above, components for producing various decorative effects can be added to the decorative display unit 10 of the present invention so long as the functions of the components described above are not impaired. For example, as shown in FIG. 7, an image layer 7 comprising characters, graphics and so forth may be added. The position for providing the image layer is not particularly limited, and it may be provided on the side of the light transmitting substrate on which the dots are arranged, or on the side on which the light converging elements are arranged. However, it is preferably provided as an upper layer of the dots or the light converging elements. For example, if a light diffusing layer is provided on the side of the surface on which the dots are arranged, an image layer is provided on the side of the surface on which the light converging elements are arranged, and a sufficient distance (although it cannot be generally defined, it is usually 5 mm or more) is provided between the image formation position of the decorative display unit and the image layer by using a sufficient thickness of the light transmitting substrate or the like, characters and so forth of the image layer overlap the virtual image and the flatly projected image, and thus the image formed by the total apparatus and visually recognized should have a feeling of depth and superior visual effect.

Such an image layer can be formed by printing using screen printing etc., adhesion of a cutting sheet cut into a desired shape, or the like.

Moreover, the decorative display unit may have an antireflection layer on at least one surface thereof. This prevents reduction of light quantity of the image projected from the projector, and thus the image can be visually recognized by a viewer as a bright image.

The decorative display unit may further have a hard coat layer on at least one surface thereof. This prevents degradation of display quality due to scratching of the surface.

Figure 8:
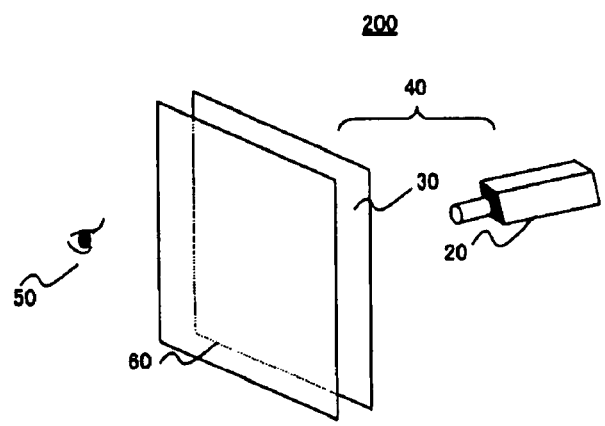
FIG. 8 shows an example of arrangement of an image display apparatus according to the second embodiment of the present invention.
Figure 9:
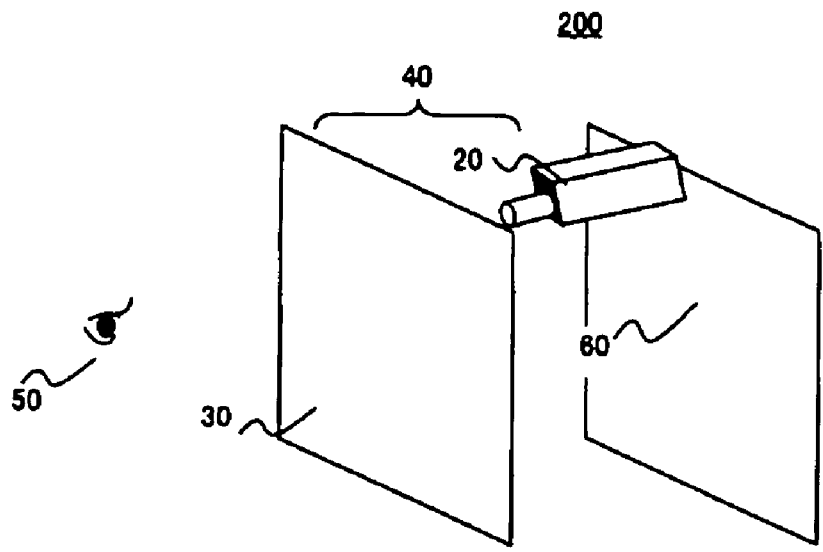
FIG. 9 shows another example of arrangement of the image display apparatus according to the second embodiment of the present invention.
Figure 10:
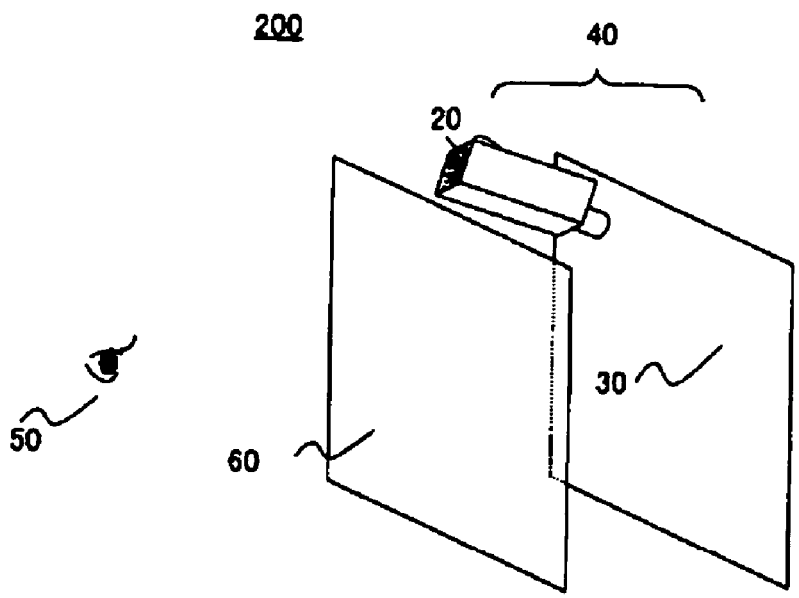
FIG. 10 shows a further example of arrangement of the image display apparatus according to the second embodiment of the present invention.

Hereafter, the second embodiment of the image display apparatus of the present invention will be explained. FIGS. 8 to 10 show different examples of the arrangement according to the second embodiment.

This image display apparatus 200 comprises an image displaying means 40 which displays a two-dimensional image, and a decorative display unit 60 for forming a virtual image at a position different from the position of the image formed by the image displaying means to impart perspective (feeling of depth) to the image. The image displaying means 40 is not particularly limited so long as it can display an image, and it may be one comprising a screen 30 and a projector 20 as shown in FIGS. 8 to 10, or it may be a monitor such as a liquid crystal display. As the screen, projector, monitor and so forth, those conventionally well known can be used.

Although the image displaying means may be disposed on either side of the decorative display unit (FIGS. 8 and 9), it is desirably disposed on the side of the surface on which the dots are arranged as shown in FIG. 8. Moreover, the space between the image displaying means (screen 30) and the decorative display unit 60 is not particularly limited. However, if visibility of the image, balance of the distances from the plane image and the virtual image, and balance of the aforementioned three kinds of information visually recognized at three different positions are taken into consideration, the interval between them is preferably 5 mm or more, more preferably 5 to 500 mm, still more preferably 10 to 200 mm.

The decorative display unit 60 comprises a light transmitting substrate in which multiple colored dots are arranged on one surface of the substrate, and multiple light transmitting light converging elements are arranged on the other surface, and it is disposed so that the side on which the light converging elements are arranged should face a viewer 50. The components constituting the decorative display unit 60, the light transmitting substrate, the dots and the light converging elements are the same as those of the decorative display unit 10 of the first embodiment. That is, the dots and the light converging elements are formed on both sides of the light transmitting substrate in a predetermined pattern, respectively, and thereby an enlarged virtual image of the dots is formed at a position different from the dot-formed plane to impart a feeling of depth to an image displayed on the image displaying means 40. However, because the decorative display unit 60 of this embodiment is not required in itself to have an image formation function (function as a screen), it does not need to be provided with an element therefor, for example, a light diffusing layer. Moreover, except for the case where the decorative display unit is disposed behind the image displaying means 40 as shown in FIG. 9, it desirably has, as a whole, a total light transmission (JIS-K 7361-1:1997) of 35% or more, more preferably 50% or more, still more preferably 80% or more. So long as it has such a light transmitting property, it may have an image formation function.

In the image display apparatus of this embodiment, the decorative display unit 60 and the image displaying means 40 are adjacently disposed, and an image is displayed on the image displaying means 40. Therefore, an image flatly projected on the image displaying means 40 is recognized together with an overlapping virtual image of the dots formed by the decorative display unit 60 at a position different from that of the flatly projected image in the depth direction, and thus a superior three-dimensional-like visual effect can be attained.

Figure 11:
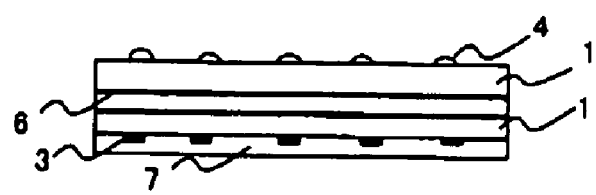
FIG. 11 shows a sectional view of another example of the decorative display unit of the present invention.

Also to the decorative display unit 60 of this embodiment, components for producing various decorative effects can be added so long as the functions of the aforementioned components are not impaired. For example, as shown in FIG. 11, it may have an image layer 7 comprising characters, graphics and so forth. By providing the image layer 7, the three kinds of information, the virtual image formed by the decorative display unit 60, the flatly projected image and the characters etc. of the image layer, are visually recognized at different positions in the depth direction, and thus an image of extremely superior visual effect can be obtained.

Moreover, the decorative display unit may have an antireflection layer on at least one surface thereof. This prevents reduction of light quantity of the image projected from the projector, and thus the image can be visually recognized by a viewer as a bright image.

The decorative display unit may further have a hard coat layer on at least one surface thereof. This prevents degradation of display quality due to scratching of the surface.

As explained above, the image display apparatus of the present invention produces a virtual image of dots at a position different in the depth direction from the position at which an image is formed or displayed. Therefore, a three-dimensional-like visual effect can be obtained, and superior feeling of presence can be obtained. Although the image display apparatus of the present invention can be applied to various images, the image projected from the projector or the image displayed on the image displaying means is preferably selected so that a three-dimensionally enlarged virtual image can be clearly displayed and recognized. Specifically, an image having a high background ratio is preferred. It is desirable that the background portions in the image account for preferably 40% or more, more preferably 60% or more. Moreover, it is preferable to enlarge the difference in brightness between the color of the virtual image (color of the dots) and the color of the background of the image and thereby obtain favorable contrast. Moreover, the image is more preferably animation rather than a still image. By these characteristics, the image display apparatus can provide an image having a further enhanced feeling of depth and superior visual effect.

EXAMPLES

Hereafter, examples of the present invention will be explained. The terms "part" and "%" are used on the weight bases unless specially indicated.

Example 1

On one surface of a transparent plastic plate having a thickness of 1 mm, circular light converging elements were printed by screen printing using a screen fabric of a screen ruling of 15 and transparent ink of No. 4000 series of Jujo Kasei at a rate of 40% (areal rate of light converging elements per unit area) so that the light converging elements should be formed with pitches the same as pitches of squares formed by screen lines constituting the screen fabric.

Then, on a transparent plastic film having a thickness of 0.1 mm, circular dots were formed by using a screen fabric having a screen ruling of 18 so that the dots should be formed with pitches the same as pitches of squares formed by screen lines constituting the screen fabric. Specific production process of the dots was as follows.

First, picture data for a screen fabric having a screen ruling of 18 were obtained on a personal computer (Power Mac 9600/300. Apple) by using an editing software (Adobe Photoshop 5.02 J, Adobe Systems), and then transferred to another personal computer (Power Mac 9600/350, Apple) by using an outputting software (Quark XPress 3.3 J, Adobe Systems). The transferred picture data were processed into image data by using a processing software for converting picture date into image data (AD-310PM Ver 2.0, Dainippon Screen Mfg.), and the image data were transferred to an image setter (FT-R3050, Dainippon Screen Mfg.) to print an image on a photosensitive film. The image was developed in an automatic processor (KODAMATIC 710 Processor, Kodak Japan) to obtain a transparent film on which dots were formed.

Subsequently, the transparent plastic plate on which the light converging elements were printed and the transparent plastic film on which the dots were formed were adhered to each other so that the surface on which the light converging elements were printed and the surface on which the dots were formed should face outward to obtain a decorative display unit with which a virtual image was recognized behind the dots.

Then, an image displaying means consisting of a light transmitting screen (DILAD Screen GS, haze: 92%, Kimoto) and a liquid crystal projector (XV-P3. Sharp) was disposed on the dot-formed surface side of the decorative display unit so that the distance between the decorative display unit and the light transmitting screen should become 150 mm to obtain an image display apparatus (FIG. 8).

Example 2

A decorative display unit was obtained in the same manner as that used in Example 1. and a cutting sheet cut into a desired shape was adhered on the dots of the decorative display unit to obtain a decorative display unit with which a virtual image was recognized behind an image. Then, an image display apparatus was obtained in the same manner as that used in Example 1 (FIG. 8).

Example 3

A decorative display unit was obtained in the same manner as that used in Example 1. and a light transmitting screen (DILAD Screen GS, haze: 92%, Kimoto) was adhered on the dots of the decorative display unit to obtain a decorative display unit with which a virtual image was recognized behind the dots.

Then, a liquid crystal projector (XV-P3. Sharp) was disposed so as to project an image from the dot side of the decorative display unit to obtain an image display apparatus (FIG. 1).

Example 4

A decorative display unit was prepared in the same manner as that used in Example 3 except that a screen fabric having a screen ruling of 20 was used for printing the light converging elements, and a screen fabric having a screen ruling of 17 was used for forming the dots to obtain a decorative display unit with which a virtual image was recognized in front of the dots.

Then, a liquid crystal projector (XV-P3, Sharp) was disposed so as to project an image from the dot side of the decorative display unit to obtain an image display apparatus (FIG. 1).

Images were displayed on the image display apparatuses obtained in Examples 1 to 4. As a result, a virtual image displayed in a three-dimensionally enlarged size and an image displayed on each image displaying means or decorative display unit overlapped each other, and thereby an image having a feeling of depth and superior visual effect could be recognized. Moreover, with the image display apparatus of Example 2, graphics of the image layer were recognized at the foremost position from the viewer side, the image displayed on the image displaying means was recognized at the next position, and the three-dimensionally enlarged virtual image was recognized at the backmost position. Thus, the image had an extremely superior visual effect.

Moreover, the decorative display bodies of Examples 3 and 4 could form an image thereon, and therefore when an image was projected from the projector, a three-dimensionally enlarged virtual image and a flatly projected image overlapped each other, and thus an image having a superior visual effect could be recognized.

The invention claimed is:

1. An image display apparatus provided with a projector, a decorative display means comprising a light transmitting substrate having multiple colored dots arranged on one surface of the substrate and multiple light transmitting light converging elements arranged on the other surface of the substrate for forming a virtual image of the dots at a position distant from the surface of the substrate on which the dots are arranged in a direction crossing the substrate, and a means for forming an image of light projected from the projector on the light transmitting substrate.

2. The image display apparatus according to claim 1, wherein directions of the arrangements of the dots and light converging elements of the decorative display means are identical to each other, and pitches thereof are different from each other.

3. The image display apparatus according to claim 1, wherein the decorative display means forms a virtual image having the same shape as a shape of an image formed on the dots in an enlarged size at a position behind the dots.

4. The image display apparatus according to claim 1, wherein the decorative display means forms a virtual image having the same shape as a shape of an image formed on the dots in an enlarged size at a position in front of the dots.

5. The image display apparatus according to claim 1, wherein the multiple colored dots are formed of a colored material on the one surface of the substrate and the light transmitting light converging elements, formed on the other surface of the substrate, are convex shapes of a light transmitting material.

6. The image display apparatus according to claim 5, wherein the colored material of the multiple colored dots is a colored ink and the light transmitting material of the convex shapes is a light transmitting ink.

7. The image display apparatus according to claim 5 wherein the virtual image is displayed as a three-dimensionally enlarged image.

8. The image display apparatus according to claim 1 wherein the virtual image is displayed as a three-dimensionally enlarged image.

9. An image display apparatus comprising a decorative display means comprising a light transmitting substrate having multiple colored dots arranged on one surface of the substrate and multiple light transmitting light converging elements arranged on the other surface of the substrate for forming a virtual image of the dots at a position distant from the surface of the substrate on which the dots are arranged in a direction crossing the substrate, and an image displaying means disposed adjacent to the decorative display means.

10. The image display apparatus according to claim 9, wherein the image displaying means consists of a projector and an image formation means for forming an image from light projected from the projector.

11. The image display apparatus according to claim 9, wherein directions of the arrangements of the dots and light converging elements of the decorative display means are identical to each other, and pitches thereof are different from each other.

12. The image display apparatus according to claim 9, wherein the decorative display means forms a virtual image having the same shape as a shape of an image formed on the dots in an enlarged size at a position behind the dots.

13. The image display apparatus according to claim 9, wherein the decorative display means forms a virtual image having the same shape as a shape of an image formed on the dots in an enlarged size at a position in front of the dots.

14. The image display apparatus according to claim 9, wherein the multiple colored dots are formed of a colored material on the one surface of the substrate and the multiple light transmitting light converging elements, formed on the other surface of the substrate, are convex shapes of a light transmitting material.

15. The image display apparatus according to claim 14, wherein the colored material of the multiple colored dots is a colored ink and the light transmitting material of the convex shapes is a light transmitting ink.

16. The image display apparatus according to claim 14 wherein the virtual image is displayed as a three-dimensionally enlarged image.

17. A decorative display unit comprising a light transmitting substrate having multiple colored dots arranged on one surface of the substrate and multiple light transmitting light converging elements arranged on the other surface of the substrate, at least a part of which is provided with an image formation means for forming an image from light projected from a projector.

18. The image display apparatus according to claim 17, wherein the multiple colored dots are formed of a colored material on the one surface of the substrate and the multiple light transmitting light converging elements, formed on the other surface of the substrate, are convex shapes of a light transmitting material.

19. The image display apparatus according to claim 18, wherein the colored material of the multiple colored dots is a colored ink and the light transmitting material of the convex shapes is a light transmitting ink.

20. The image display apparatus according to claim 19 wherein the virtual image is displayed as a three-dimensionally enlarged image.

* * * * *